United States Patent
Al-Otoom et al.

(10) Patent No.: US 11,379,240 B2
(45) Date of Patent: Jul. 5, 2022

(54) INDIRECT BRANCH PREDICTOR BASED ON REGISTER OPERANDS

(71) Applicant: Apple Inc., Cupertino, CA (US)

(72) Inventors: Muawya M. Al-Otoom, Pleasanton, CA (US); Ian D. Kountanis, Santa Clara, CA (US); Conrado Blasco, Sunnyvale, CA (US); Haoyan Jia, Fremont, CA (US); Amit Kumar, Fremont, CA (US)

(73) Assignee: Apple Inc., Cupertino, CA (US)

( * ) Notice: Subject to any disclaimer, the term of this patent is extended or adjusted under 35 U.S.C. 154(b) by 170 days.

(21) Appl. No.: 16/778,939

(22) Filed: Jan. 31, 2020

(65) Prior Publication Data

US 2021/0240477 A1    Aug. 5, 2021

(51) Int. Cl.
*G06F 9/38*    (2018.01)

(52) U.S. Cl.
CPC .......... *G06F 9/3806* (2013.01); *G06F 9/3844* (2013.01); *G06F 9/3848* (2013.01)

(58) Field of Classification Search
CPC .... G06F 9/3848; G06F 9/3844; G06F 9/3806; G06F 9/3838
See application file for complete search history.

(56) References Cited

U.S. PATENT DOCUMENTS

| | | | |
|---|---|---|---|
| 6,721,877 B1 | 4/2004 | Chen et al. | |
| 7,707,397 B2 | 4/2010 | Henry | |
| 8,555,040 B2 | 10/2013 | Beaumont-Smith et al. | |
| 8,782,384 B2 | 7/2014 | Suggs et al. | |
| 9,983,878 B2 | 5/2018 | Levitan et al. | |
| 10,318,304 B2 | 6/2019 | Manoukian | |
| 2001/0021974 A1* | 9/2001 | Lee | G06F 9/3848 712/240 |
| 2011/0078425 A1 | 3/2011 | Shah et al. | |
| 2011/0289300 A1* | 11/2011 | Beaumont-Smith | G06F 9/3806 712/205 |

(Continued)

OTHER PUBLICATIONS

Chintan Dipakchandra Panirwala, "Exploring Correlation for Indirect Branch Prediction", North Carolina State University, pp. 15-18 and 28-34 (Year: 2012).*

(Continued)

*Primary Examiner* — Courtney P Carmichael-Moody
(74) *Attorney, Agent, or Firm* — Kowert, Hood, Munyon, Rankin & Goetzel, P.C.; Lawrence J. Merkel

(57) ABSTRACT

In an embodiment, an indirect branch predictor generates indirect branch predictions based on one or more register values. The register values may be the contents of registers on which the indirect branch instruction is directly or indirectly dependent for generating the branch target address, for example. In an embodiment, at least one of the registers may be a source for a load instruction, and the indirect branch may be dependent (directly or indirectly) on the target of the load. In an embodiment, the indirect branch predictor may be one of at least two indirect branch predictors in a processor. The other indirect branch predictor may be based on a fetch address, or PC, associated with the indirect branch instruction. The other indirect branch predictor may generate a first predicted target address, and the indirect branch predictor may generate a second predicted target address for the same indirect branch instruction.

20 Claims, 6 Drawing Sheets

(56) References Cited

U.S. PATENT DOCUMENTS

| | | |
|---|---|---|
| 2011/0320787 A1 | 12/2011 | Dieffenderfer et al. |
| 2012/0079255 A1* | 3/2012 | Combs ................ G06F 9/30061 |
| | | 712/239 |
| 2012/0124347 A1 | 5/2012 | Dundas |
| 2013/0151823 A1* | 6/2013 | Beaumont-Smith ......................... |
| | | G06F 9/3848 |
| | | 712/240 |
| 2014/0089647 A1 | 3/2014 | Kountanis |
| 2014/0281441 A1 | 9/2014 | Manoukian |
| 2020/0050459 A1 | 2/2020 | Palivela |
| 2020/0133678 A1* | 4/2020 | Gellerich .............. G06F 9/3844 |
| 2021/0004234 A1 | 1/2021 | Hu |

OTHER PUBLICATIONS

U.S. Appl. No. 16/778,913, Office Action, dated Jul. 14, 2021, 27 pages.

* cited by examiner

94 ── pred sts-temp, x16, x1, {IBP target}
96 ── br x17, sts-temp

INDIRECT BRANCH PREDICTOR BASED ON REGISTER OPERANDS

BACKGROUND

Technical Field

Embodiments described herein are related to processors and, more particularly to indirect branch prediction in processors.

Description of the Related Art

High performance processors implement branch prediction in order to speculate beyond branch instructions and identify additional instructions for execution based on the prediction. There are various forms of branch prediction. For example, branch direction prediction is used to predict conditional branches, which are either taken (instruction execution continues at a branch target address specified by the branch instruction) or not taken (instruction execution continues at a next sequential address to the fetch address of the branch instruction). Indirect branch instructions have a branch target address that is at least partially determined from the contents of a register (as compared to other branch instructions, which determine a branch target address based on one or more of the fetch address of the branch instruction, an offset specified by the branch instruction in a displacement or immediate field, etc.). Indirect branch predictors attempt to predict the branch target address of indirect branch instructions. A branch target address may be more succinctly referred to herein as a "target address," a "branch target," or a "target."

Many indirect branch instructions are relatively static, having one target address or a few different target addresses during execution. Such indirect branch instructions can be fairly accurately predicted using the fetch address of the indirect branch instruction (also referred to as the program counter (PC) of the instruction) and some branch history. Other indirect branch instructions are more dynamic, having numerous target addresses during execution and switching among the various target addresses frequently. The more dynamic indirect branch instructions are much more difficult to predict, and are frequently mispredicted by typical indirect branch predictors. If a particular dynamic indirect branch instruction is also frequently executed, performance of the processor can be significantly impacted.

SUMMARY

In an embodiment, an indirect branch predictor generates indirect branch predictions based on one or more register values. The register values may be the contents of registers on which the indirect branch instruction is directly or indirectly dependent for generating the branch target address, for example. In an embodiment, at least one of the registers may be a source for a load instruction, and the indirect branch may be dependent (directly or indirectly) on the target of the load. The indirect branch instruction may be predicted with high accuracy based on the register values, which may improve performance due to the more accurate prediction.

In an embodiment, the indirect branch predictor may be one of at least two indirect branch predictors in a processor. The other indirect branch predictor may be based on a fetch address, or PC, associated with the indirect branch instruction. The other indirect branch predictor may operate near the front of the processor pipeline, within one or a few pipeline stages of fetch address generation. The register-based indirect branch predictor may operate at the execution stage of the pipeline, when register values became available. The PC-based indirect branch predictor may generate a first predicted target address, and the indirect branch predictor may generate a second predicted target address for the same indirect branch instruction. If the second predicted target address is not the same as the first predicted target address, a redirect of fetch to the second predicted target address and a flush of the instructions fetched from the first predicted target address may be performed. The redirect/flush may often be earlier in time than the actual execution of the indirect branch instruction itself, improving performance compared to the detection of misprediction when the indirect branch instruction is executed (assuming the second predicted target address is correct). The second predicted target address may be verified during execution of the indirect branch instruction, and a second flush may be performed if the second predicted target address is incorrect.

BRIEF DESCRIPTION OF THE DRAWINGS

The following detailed description makes reference to the accompanying drawings, which are now briefly described.

Figure 1:
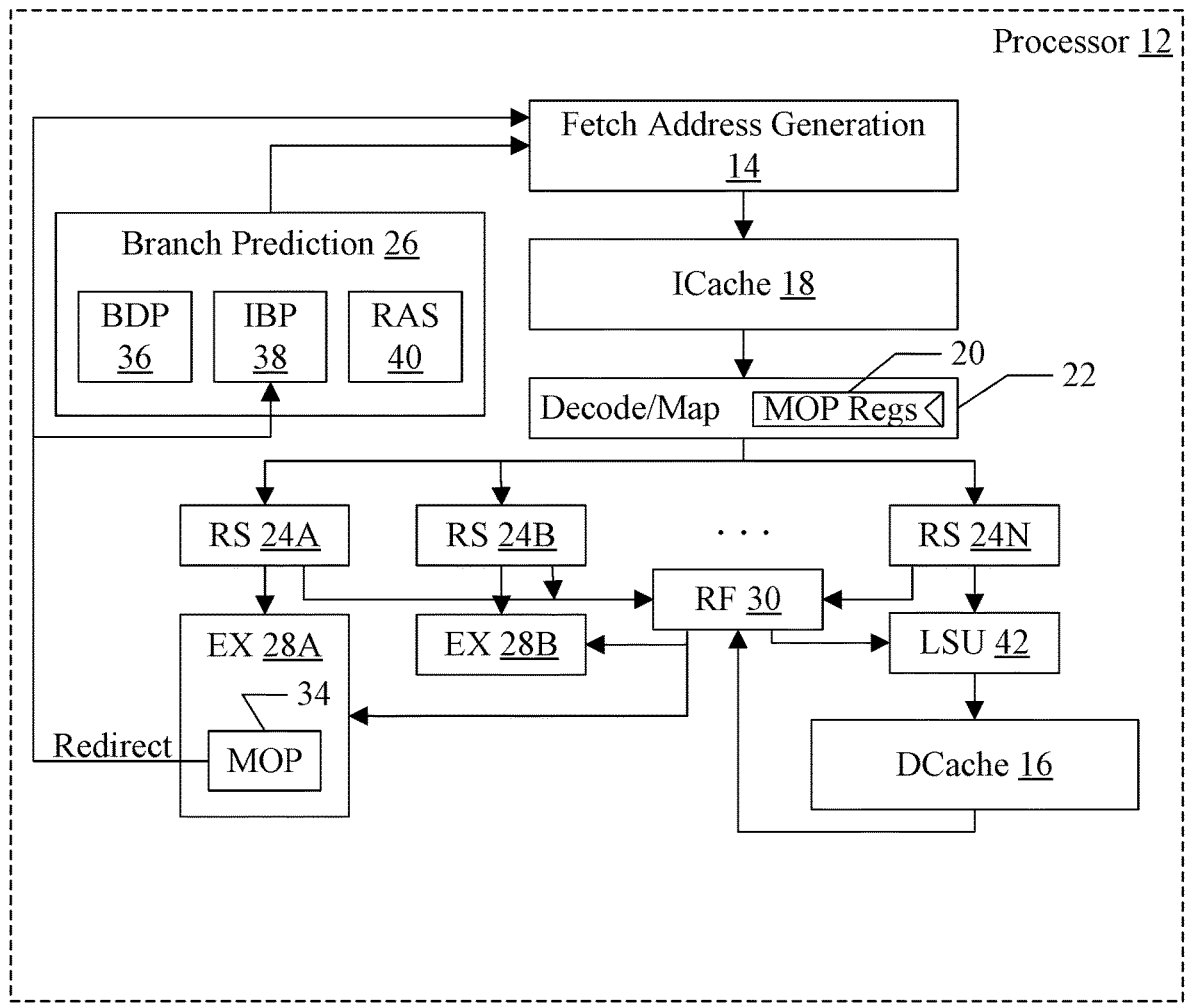
FIG. 1 is a block diagram of one embodiment of a processor including a method/object predictor (MOP).

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean "including, but not limited to." As used herein, the terms "first," "second," etc. are used as labels for nouns that they precede, and do not imply any type of ordering (e.g., spatial, temporal, logical, etc.) unless specifically stated.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be said to be "configured" to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

This specification may use the words "a" or "an" to refer to an element, or "the" to refer to the element. These words are not intended to mean that there is only one instance of the element. There may be more than one in various embodiments. Thus, "a", "an", and "the" should be interpreted to mean "one or more" unless expressly described as only one.

This specification may describe various components, units, circuits, etc. as being coupled. In some embodiments, the components, units, circuits, etc. may be coupled if they are electrically coupled (e.g. directly connected or indirectly connected through one or more other circuits) and/or communicatively coupled.

DETAILED DESCRIPTION OF EMBODIMENTS

Turning now to FIG. 1, a block diagram of one embodiment of a processor 12 is shown. In the illustrated embodiment, the processor 12 includes a fetch address generation circuit 14, an instruction cache ("ICache") 18, a decode/map unit 22 (including one or more configuration registers 20), a branch prediction unit 26 (including a branch direction predictor (BDP) 36, an indirect branch predictor (IBP) 38, and a return address stack (RAS) 40), one or more reservation stations 24A-24N, one or more execution units 28A-28B, a register file 30, a data cache ("DCache") 16, and a load/store unit (LSU) 42. The execution unit 28A includes a method/object predictor (MOP) 34. The MOP 34 may be another indirect branch predictor, as discussed in more detail below.

The fetch address generation circuit 14 is coupled to the ICache 18, which is coupled to the decode/map unit 22, which is coupled to the reservation stations 24A-24N. The reservation stations 24A-24B are coupled to the execution units 28A-28B as shown in FIG. 1, and the reservation station 24N is coupled to the LSU 42. The reservation stations 24A-24N are also coupled to the register file 30, which is coupled to the execution units 28A-28B and the LSU 42. The LSU 42 is also coupled to the DCache 16, which is coupled to the register file 30. The branch prediction unit 26 is coupled to the fetch address generation circuit 14. The MOP 34 is configured to provide a redirect to the fetch address generation circuit 14 and the IBP 38 in the illustrated embodiment.

The fetch address generation circuit 14 may be configured to generate fetch addresses (fetch PCs) to fetch instructions from the ICache 18 for execution by the processor 12. The fetch address generation circuit 14 may implement various prediction structures to predict the fetch path. For example, a next fetch predictor may be used to predict fetch addresses based on previously executed instructions. In such an embodiment, the branch prediction unit 26 may be used to verify the next fetch prediction. Alternatively, the branch prediction unit 26 may be used to predict next fetch addresses, if the next fetch predictor is not used.

In the illustrated embodiment, the branch prediction unit 26 includes various branch predictors such as the BDP 36, the IBP 38, and the RAS 40. Other embodiments may include any subset of the above branch predictors and/or other predictors. The BDP 36 may be configured to predict the taken/not taken result for conditional branches. Based on the taken/not taken result, the next fetch address may be either the branch target address or the next sequential address. The target address may be the address specified by the branch instruction (or more briefly, branch) to which fetching is to be directed when the branch is taken (or is always the location to which fetching is to be directed, for unconditional branches). The next sequential address may be the address that numerically follows the PC of the branch, and may be the next fetch address if the branch is not taken (similar to non-branch instructions, which are fetched in sequential order). The RAS 40 may predict the fetch addresses for return instructions, based on previous call instructions. The call and return instructions may be used, e.g. to call and return from subroutines/functions, etc. The call instruction may push a return address on the stack (e.g. to the next sequential instruction after the call), and the return instruction may pop the top of the stack to generate the return address. The stack may be in memory, or may be simulated via a register written by the call instruction and read by the return instruction.

The indirect branch predictor 38 may predict the target address of an indirect branch instruction. The indirect branch predictor 38 may include one or more memories that store previously-generated indirect branch targets. The memories may be indexed by the PC corresponding to the indirect branch instruction (or a portion of the PC), and/or a hash of the PC and some number of branch history bits. Any type of branch history may be used. For example, the branch history may be a history of recent taken and not-taken branches, with each branch represented by a set bit for taken and a clear bit for not taken or vice versa. As branches are encountered, the history may be updated with the most recent taken/not taken bit and the oldest history bit may be discarded, e.g. by shifting the bits. In another example, one or more bits of PC may be used as branch history. Combinations of the above, and/or any other branch history, may be used in various embodiments.

In an embodiment, the IBP 38 may be a Tagged Geometric (TAGE)-style branch predictor which has multiple memories. A base memory may be indexed by the PC or a hash of the PC, and other memories may be indexed by the PC hashed with different amounts of branch history. The base memory may not be tagged, but the other memories may be tagged. If a tag hit is detected in one or more of the other memories, the branch target address may be predicted to be the target address from the memory that is indexed with the largest amount of history and that is also a tag hit for the branch. If no tag hit is detected, the branch target address may be predicted to be the target address from the base memory. Other embodiments may implement other types of indirect branch predictors 38. For example, a single table indexed by branch PC and branch history, or simply branch PC, may be used. A single tagged table may be used.

As mentioned previously, the MOP 34 may be also be an indirect branch predictor. The MOP 34 may be used to verify and/or more accurately predict the branch target address for dynamic indirect branch instructions (e.g. indirect branch instructions that have a larger number of unique targets during execution, as compared to other indirect branch instructions). The MOP 34 may use different and/or additional information to predict the indirect branch instructions. For example, in an embodiment, the MOP 34 may use register values (e.g. the contents of one or more registers) to predict the indirect branch instruction. The indirect branch instruction may be dependent, directly or indirectly, on the register values for the generation of the target address. For example, in one embodiment, the register values may be from registers that are sources of one or more load instructions that read memory locations from which the indirect branch target address is derived. One or more of the register values may be used to generate the address of the memory location read by the load. In an embodiment, the register values may include values from registers that are a target of a load instruction. The target register may receive the data read from the memory location. Such target registers may also be the source registers of other loads that affect the generation of the indirect branch target address. Register values used by the MOP 34 may include values from register that are the target of other instructions which depend on the load instructions. In other embodiments, the indirect branch instruction may be directly dependent on one or more of the register values. The indirect branch instruction may be directly dependent on a previous instruction if the target register of the previous instruction is a source register of the indirect branch instruction. The indirect branch instruction may be indirectly dependent on a previous instruction if the target register of the previous instruction indirectly affects the generation of the source register for the indirect branch instruction (e.g. the source register is the target of an instruction having a source register directly dependent on the previous instruction, or indirectly dependent on the previous instruction through one or more other instructions).

The processor 12 may detect the dynamic indirect branches that are to be predicted by the MOP 34 in various fashions. For example, the processor 12 may monitor the behavior of various indirect branches (e.g. by fetch PC of the indirect branches) to detect instances of indirect branches that frequently change the branch target address among multiple different indirect branches. In other embodiments, the indirect branch instructions may be identified by software (e.g. by programming data in the configuration registers 20) to permit the processor 12 to detect such indirect branches.

Figure 2:
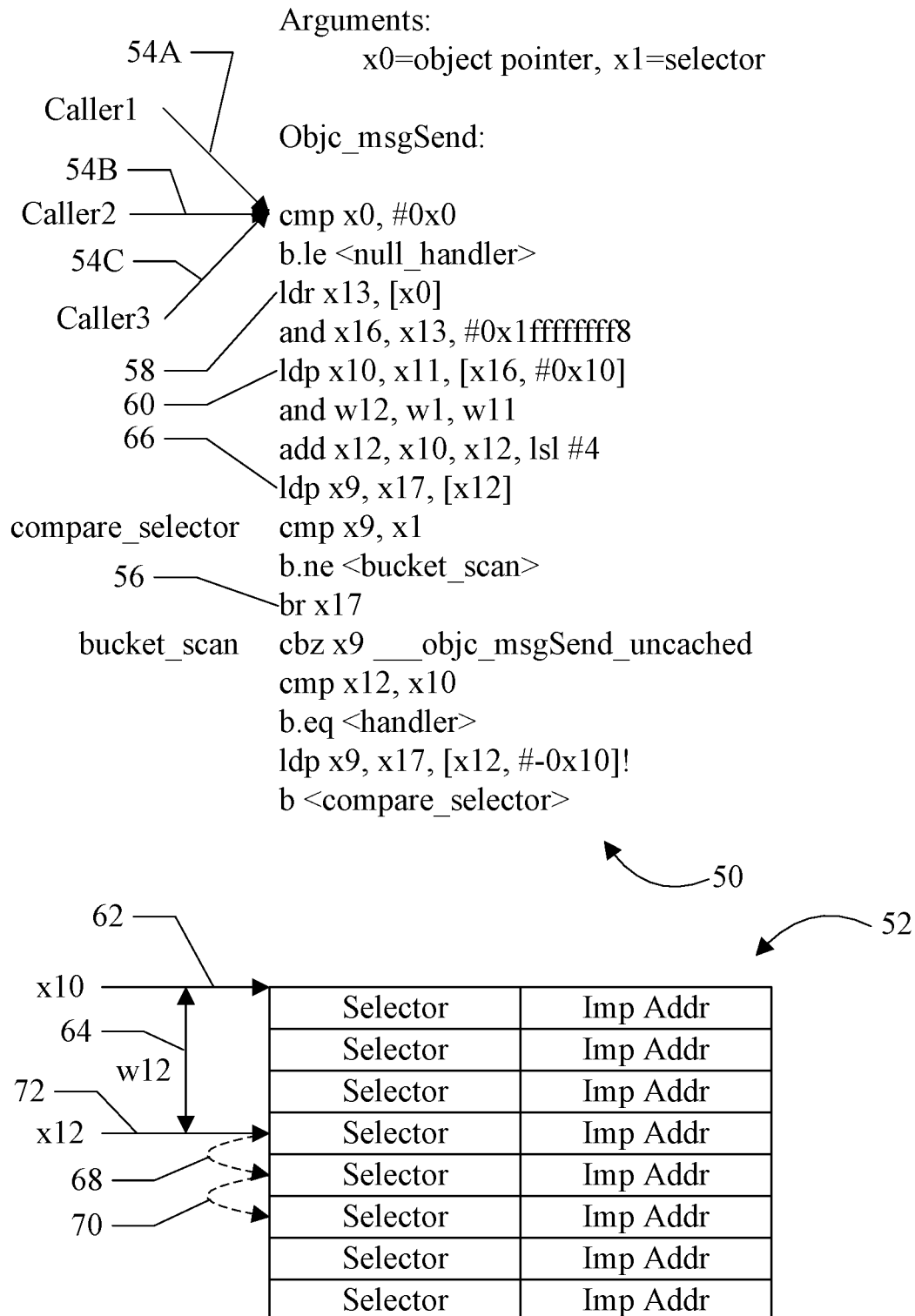
FIG. 2 is a block diagram of one embodiment of a method/object mapping function.

In one embodiment, a specific indirect branch accounts for a high percentage of the indirect branch mispredictions. The indirect branch is a branch used in the objective C message send function call. Objective C uses the C programming language, but also includes an object-orientated structure. Objective C is class-based, and each class has objects. The class defines the object's behavior, e.g. such as data types and methods that operate on the data. The methods are resolved at runtime. Accordingly, a program in objective C sends a message to a method using the method name and object name. The object name maps to the class, and a table for the given class includes a mapping of the method name to an address at which the method implementation (the code sequence that implements the method) is stored. The message send routine looks up the table, and terminates with an indirect branch to the address read from the method table. The terminating indirect branch may thus be an indirect branch with many different targets during use. FIG. 2 is an example of the objective C message send routine, and will be described in more detail below.

There may be a correlation between the caller of the objective C message send routine and the target address of the terminating indirect branch. That is, a given caller may frequently be sending a message to the same method of a given object (or objects within the same class). In one embodiment, the IBP 38 may be designed to take advantage of the correlation, and may be programmed (similar to the configuration registers 20) with data that identifies the terminating indirect branch of the objective C message send routine. In such an embodiment, the IBP 38 may use the previous taken PC (which may be the PC of the caller) as the PC used to predict the terminating indirect branch. Other indirect branch instructions may be predicted using the PC of the indirect branch itself. Still other embodiments may not modify the IBP 38 in the above fashion, and may make predictions based on the PCs of the indirect branch instructions. Thus, in general, the IBP 38 may predict indirect branch instructions based on a fetch address associated with the indirect branch instruction (or corresponding to the indirect branch instruction). The associated/corresponding fetch address may be the PC of the indirect branch instruction, a previous PC, a previous taken PC, etc. The associated/corresponding fetch address may be a different PC (current, previous, previous taken, etc.) for different indirect branch instructions. For example, relatively static indirect branch instructions may use the current PC of the indirect branch instruction itself, while dynamic indirect branch instructions such as the terminating indirect branch of the objective C message send routine may use the previous PC or previous taken PC. Additionally, an associated/corresponding PC may not be precisely the PC of the instruction itself, but may rather be the fetch address used to fetch instructions from the ICache 16 as a group, which ends with the indirect branch instruction.

In one embodiment, the MOP configuration registers 20 may include data that specifies the register addresses (or register numbers) of the register contents that are to be used by the MOP 34 to predict a given dynamic indirect branch instruction. The register address may be an architected register address. Embodiments which employ a larger physical register file 30 and employ register renaming to map instances of the architected registers to physical registers may pass the MOP register addresses through the renamer to identify the current physical register assigned to the architected register.

More particularly, the decode/map unit 22 may decode an indirect branch instruction into two operations, in one embodiment. The first operation may take the registers identified by the MOP configuration registers 20 as source operands, and may cause the MOP 34 to generate a prediction. The other operation may be the indirect branch operation. The operation that accesses the MOP 34 may be issued when the register operands are ready, which may be well in advance of when the indirect branch is ready to issue in some cases. The MOP 34 may generate a prediction, and compare the prediction to the prediction generated by the IBP 38. If the predictions mismatch (e.g. a miscompare is detected), the MOP 34 may signal a redirect to the fetch address generation circuit 14 to cause instruction fetching to be redirected to the newly-predicted target address. By redirecting the fetch to the newly-predicted (and more accurate) target address, performance may be improved by more rapidly reaching the correct target instructions. The IBP 38 may optionally be informed of the redirect as well, to capture the newly-predicted target address for training. Alternatively, the IBP 38 may be trained on the indirect branch operation itself and need not receive the redirect indication in other embodiments. If the MOP 34 does not detect a mismatch in the predictions, then no redirect may be signaled.

In addition to redirecting the fetch, a misprediction detected by the MOP 34 may cause the instructions at the previously-predicted target address to be flushed. The decode/map unit 22 may manage the flushing of the instructions, e.g. using the reorder buffer and recovering the register renaming to the state prior to the flushed instructions, etc.

The decode/map unit 22 may be configured to decode the fetched instructions from the ICache 18 into instruction operations. In some embodiments, a given instruction may be decoded into one or more instruction operations, depending on the complexity of the instruction. Particularly complex instructions may be microcoded, in some embodiments. In such embodiments, the microcode routine for the instruction may be coded in instruction operations. In other embodiments, each instruction in the instruction set architecture implemented by the processor 12 may be decoded into a single instruction operation, and thus the instruction operation may be essentially synonymous with instruction (although it may be modified in form by the decoder). The term "instruction operation" may be more briefly referred to herein as "op."

The decode/map unit 22 may be configured to map the ops to speculative resources (e.g. physical registers) to permit out-of-order and/or speculative execution, and may dispatch the ops to the reservation stations 24A-24N. The ops may be mapped to physical registers in the register file 30 from the architectural registers used in the corresponding instructions. That is, the register file 30 may implement a set of physical registers that may be greater in number than the architected registers specified by the instruction set architecture implemented by the processor 12. The decode/map unit 22 may manage the mapping of the architected registers to physical registers. There may be separate physical registers for different operand types (e.g. integer, vector, floating point, etc.) in an embodiment. In other embodiments, the physical registers may be shared over operand types. The decode/map unit 22 may also be responsible for tracking the speculative execution and retiring ops or flushing misspeculated ops. A reorder buffer may be used to track the program order of ops and manage retirement/flush, for example, as mentioned above.

Ops may be scheduled for execution when the source operands for the ops are ready. In the illustrated embodiment, decentralized scheduling is used for each of the execution units 28A-28B and the LSU 42, e.g. in the reservation stations 24A-24N. Other embodiments may implement a centralized scheduler if desired. Scheduled ops may read their source operands from the register file 30 and/or may have operands forwarded from previous ops executed by the execution units 28A-28B and/or LSU 42. The results of ops that have target registers may be written to the register file 30 and/or forwarded to dependent ops.

The LSU 42 may be configured to execute load/store memory ops. Generally, a memory operation (memory op) may be an instruction operation that specifies an access to memory (although the memory access may be completed in a cache such as the data cache 16). A load memory operation may specify a transfer of data from a memory location to a register, while a store memory operation may specify a transfer of data from a register to a memory location. Load memory operations may be referred to as load memory ops, load ops, or loads; and store memory operations may be referred to as store memory ops, store ops, or stores. In an embodiment, store ops may be executed as a store address op and a store data op. The store address op may be defined to generate the address of the store, to probe the cache for an initial hit/miss determination, and to update the store queue with the address and cache info. Thus, the store address op may have the address operands as source operands. The store data op may be defined to deliver the store data to the store queue. Thus, the store data op may not have the address operands as source operands, but may have the store data operand as a source operand. In many cases, the address operands of a store may be available before the store data operand, and thus the address may be determined and made available earlier than the store data. In some embodiments, it may be possible for the store data op to be executed before the corresponding store address op, e.g. if the store data operand is provided before one or more of the store address operands. While store ops may be executed as store address and store data ops in some embodiments, other embodiments may not implement the store address/store data split.

The execution units 28A-28B may include any types of execution units in various embodiments. For example, the execution units 28A-28B may include integer, floating point, and/or vector execution units. Integer execution units may be configured to execute integer ops. Generally, an integer op is an op which performs a defined operation (e.g. arithmetic, logical, shift/rotate, etc.) on integer operands. Integers may be numeric values in which each value corresponds to a mathematical integer. The integer execution units may include branch processing hardware to process branch ops, or there may be separate branch execution units.

Floating point execution units may be configured to execute floating point ops. Generally, floating point ops may be ops that have been defined to operate on floating point operands. A floating point operand is an operand that is represented as a base raised to an exponent power and multiplied by a mantissa (or significand). The exponent, the sign of the operand, and the mantissa/significand may be represented explicitly in the operand and the base may be implicit (e.g. base 2, in an embodiment).

Vector execution units may be configured to execute vector ops. Vector processing may be characterized by performing the same processing on significant amounts of data, where each datum is a relatively small value (e.g. 8 bits or 16 bits, compared to 32 bits to 64 bits for an integer). Thus, vector ops often include single instruction-multiple data (SIMD) or vector operations on an operand that represents multiple data items.

Thus, each execution unit 28A-28B may comprise hardware configured to perform the operations defined for the ops that the particular execution unit is defined to handle. The execution units may generally be independent of each other, in the sense that each execution unit may be configured to operate on an op that was issued to that execution unit without dependence on other execution units. Viewed in another way, each execution unit may be an independent pipe for executing ops. Different execution units may have different execution latencies (e.g., different pipe lengths). Additionally, different execution units may have different latencies to the pipeline stage at which bypass occurs, and thus the clock cycles at which speculative scheduling of dependent ops occurs may vary based on the type of op and execution unit 28 that will be executing the op.

It is noted that any number and type of execution units 28A-28B may be included in various embodiments, including embodiments having one execution unit and embodiments having multiple execution units.

A cache line may be the unit of allocation/deallocation in a cache. That is, the data within the cache line may be allocated/deallocated in the cache as a unit. Cache lines may vary in size (e.g. 32 bytes, 64 bytes, 128 bytes, or larger or smaller cache lines). Different caches may have different cache line sizes. The ICache 18 and DCache 16 may each be a cache having any desired capacity, cache line size, and configuration. There may be more additional levels of cache between the DCache 16/ICache 18 and the main memory, in various embodiments.

At various points, ops are referred to as being younger or older than other ops. A first operation may be younger than a second operation if the first operation is subsequent to the second operation in program order. Similarly, a first operation may be older than a second operation if the first operation precedes the second operation in program order.

FIG. 2 is a block diagram illustrating an embodiment of the objective C message send routine 50 and an example of a method table 52 corresponding to a class. While a specific code sequence is illustrated in FIG. 2, other embodiments may use a different sequence and may still be predicted using the MOP 34. In the embodiment of FIG. 2, the objective C message send routine 50 is called with two arguments in the x0 and x1 registers. The x0 and x1 registers, and other registers illustrated in the routine 50, are architected registers defined in the instruction set architecture implemented by the processor 12. For example, the ARM instruction set architecture is used in this example, although other instruction set architectures may be used in other embodiments. The x0 register may store an object pointer which points to the object to which the message is being sent. The x1 register may store a selector, which may be a numerical value that corresponds to the method name. For example, the compiler used to compile objective C programs may assign selectors to the method names.

As illustrated by the arrows 54A-54C, the objective C method send routine 50 may be called by many different callers (e.g. caller1, caller2, caller3, etc.). The caller may be a call instruction at a particular PC, and each caller may have a different PC. There may be a correlation between the caller and the target of the indirect branch that exits the objective C message send routine (br x17, reference numeral 56). As mentioned above, the IBP 38, in some embodiments, may use this correlation by predicting the terminating indirect branch instruction using the previous taken PC, which in this case would be the PC of the caller. Other embodiments may not have such an optimization in the IBP 38.

The program order of the instructions in the routine 50 is from top to bottom as illustrated in FIG. 2. That is, a first instruction that is above a second instruction in the routine 50 as shown in FIG. 2 is prior to the second instruction in program order. Instructions may be executed out of program order, as long as dependencies between the instructions are respected.

The most frequent path through the routine 50 may include no branches until the terminating branch 56. That is, the other branches in the routine 50 before the terminating branch 56 may usually be not taken. The first two instructions of the routine, beginning with the cmp x0, #0x0, check the object pointer to make sure it is not null (address 0). A null object pointer is an error and thus should be rare. Assuming the pointer is not null, the first load instruction 58 dereferences the object pointer. That is, the x0 register is a source operand of the first load instruction 58, and the address accessed by the load is formed from the contents of the x0 register. The following "and" instruction masks non-pointer fields to extract a class pointer in register x16. A second load instruction 60 determines the start address of the method table 52 (*x*10) and a size (x11). The second load instruction 60 has the x16 register as a source operand, from which the address accessed by the second load instruction is formed. The pointer to the start address (x10) is illustrated at arrow 62. Based on the selector (x1, lower word w1) and the table size (x11, lower word w11), an index is generated in register w12 (arrow 64). The index is added to the table base to produce a pointer in x12 to the initial address at which searching for the selector is to begin within the method table 52 (arrow 72). A third load instruction 66 reads the selector and the implementation address from the entry indicated by x12 into registers x9 and x17, respectively. That is, the x12 register is a source operand of the third load instruction 66 and is used to form the address accessed by the third load instruction 66. The register x9 is compared to the selector (in x1), and if they compare equal (b.ne is not taken), the terminating indirect branch 56 branches to the method address (x17) to begin execution. If the selector from the entry (x9) is not equal to the selector input to the routine 50 (*x*1), the routine 50 branches to the bucket scan routine ("bucket scan" label in FIG. 2) and advances the pointer to the next entry (assuming the selector in x9 does not indicate that the end of the table 52 has been reached, checked by the cbz instruction, and that the pointer has not wrapped to the beginning of the table, indicated by the cmp x12, x10 and b.eq instructions). The bucket scan routine branches back to the cmp x9, x1 instruction ("compare selector" label in FIG. 2) to compare the next selector to the input selector (in x1). If the next selector matches the input selector, the terminating indirect branch 56 is executed. If the next selector does not match the input selector, another iteration of the bucket scan portion of the routine 50 is executed. The dotted arrows 68 and 70 illustrate scanning additional selectors in successive executions of the bucket scan routine.

The loads 58, 60, and 66 are thus a dependency chain that resolves before the terminating indirect branch 56 can be executed. That is, the indirect branch 56 is indirectly dependent on the first and second loads 58 and 60, because the load 66 may not execute and load x17 until the preceding loads have executed. The indirect branch 56 is directly dependent on the load 66 because it loads x17, which is a source operand of the indirect branch 56. The loads 58, 60, and 66 may have a high data cache miss rate (especially if a new target address is being selected compared to previous executions of the routine 50), and thus the resolution of the terminating indirect branch 56 (and misprediction detection) may be significantly delayed as the processor 12 speculatively executes instructions down the wrong speculative path (in the case of misprediction). However, the target address of the terminating indirect branch instruction may be correctly predicted based on the register values input to the routine 50 (*x*0 and x1), if a MOP 34 large enough to encompass all combinations of the values in x0 and x1 were implemented. For more implementable sizes, the target address may be predicted with a high degree of accuracy. The accuracy may be improved by using one of the intermediate values (x16 or x10) instead of x0, at the cost of experiencing the delay of one or more of the load misses. Accordingly, in various embodiment, the contents of x0 and x1, x16 and x1, or x10 and x1 may be used to generate an index in the MOP 34.

Examples using x0 and x1 or x16 and x1 are shown below, but x10 and x1 could also be used at the expense of two load miss delays.

Table 52 may be a table associated with a particular class. Other tables associated with other classes may also be used concurrently with the table 52. In an embodiment, the table 52 may be a software-cached version of a larger structure associated with the particular class. The software may manage the contents of the table 52 (e.g. instructions located as the "handler" label may be search for a missing selector in the larger structure and insert it into the table 52).

Figure 3:
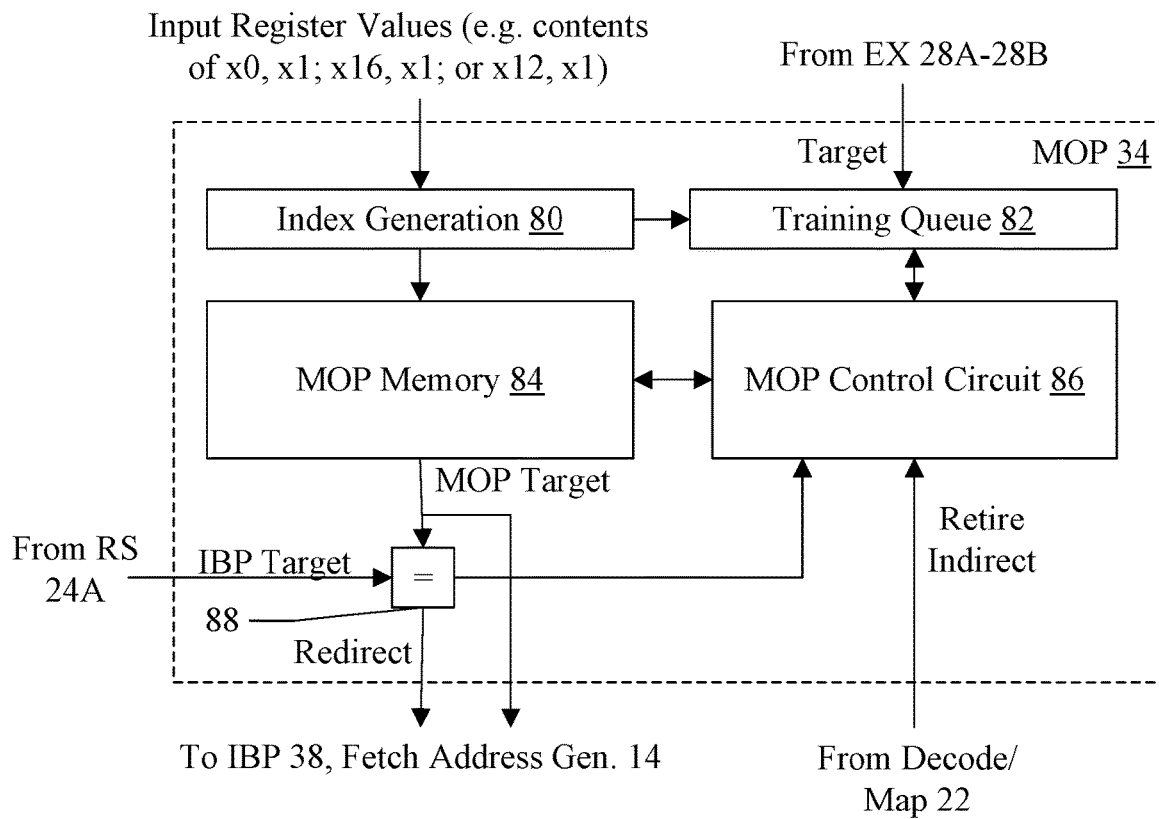
FIG. 3 is a block diagram of one embodiment of a MOP.

FIG. 3 is a block diagram illustrating one embodiment of the MOP 34 in greater detail. In the illustrated embodiment, the MOP 34 includes an index generation circuit 80, a training queue 82, a MOP memory 84, a MOP control circuit 86, and a comparator 88. The index generation circuit 80 is coupled to the input register values, the training queue 82, and the MOP memory 84. The MOP memory 84 is further coupled to the MOP control circuit 86, the comparator 88, the IBP 38 and the fetch address generation circuit 14. The MOP control circuit 86 is further coupled to the training queue 82, the comparator 88, and the decode/map unit 22. The training queue 82 is further coupled to the execution units 28A-28B. The comparator 88 is coupled to the reservation station 24A and to the IBP 38 and the fetch address generation circuit 14.

The index generation circuit 80 is configure to receive the register values (e.g. from x0 and x1, x16 and x1, or x12 and x1 in various embodiments) and is configured to generate an index to the MOP memory 84. For example, the index generation circuit 80 may compute a hash over the register values to generate the index. Alternatively, selected bits of the register values may be concatenated or hashed to generate the index. The index may select one or more memory locations in the MOP memory 84. For example, if the MOP memory 84 is direct mapped, one entry may be selected. If the MOP memory 84 is set associative, a set of memory locations may be selected and an output may be selected from the ways of the set based on a tag comparison. Any information may be used as the tag. For example, if the index is generated over a portion of the register values, the remainder of the register values may be the tag. The tag may include address space identifier information to ensure that the prediction is only used for indirect branches in the same address space as the indirect branch instruction from which the entry was generated (e.g. to prevent speculation-based attacks such as Spectre).

Assuming a hit in the MOP memory 84 is detected for the index, the MOP memory 84 may output a MOP target to the comparator 88, which may receive the predicted IBP target address from the reservation station 24A. If the MOP target and the predicted IBP target match, no redirect is asserted by the MOP 34. If the MOP target miscompares with the predicted IBP target, a redirect is asserted to the IBP 38 and the fetch address generation circuit 14. The MOP target may be provided as a corrected fetch address. Instructions fetched from the predicted IBP target may be flushed from the processor 12 in response to the redirect as well.

Viewed in another way, the MOP 34 may verify the predicted IBP target address. If the MOP 34 predicts the same target address as the IBP 38, the IBP prediction is verified and speculative fetching/execution of the instructions at the predicted target may continue. On the other hand, if the MOP 34 predicts a different target address than the IBP 38, the IBP 38 prediction is not verified and redirect/flush may occur.

The MOP control circuit 86 may be configured to allocate a training queue entry in the training queue 82 for a given indirect branch that is to be predicted by the MOP 34 (e.g. the indirect branch was decoded by the decode/map unit 22 and matched the MOP configuration in the registers 20). That is, the training queue may have a plurality of entries, each entry corresponding to one indirect branch instruction that is predicted by the MOP 34. The training queue entry may collect data related to the indirect branch instruction, and may be used to update the MOP memory entry assigned to the indirect branch instruction to improve subsequent predictions of the indirect branch instruction by the MOP 34 (e.g. during subsequent executions of the indirect branch instruction).

Figure 4:
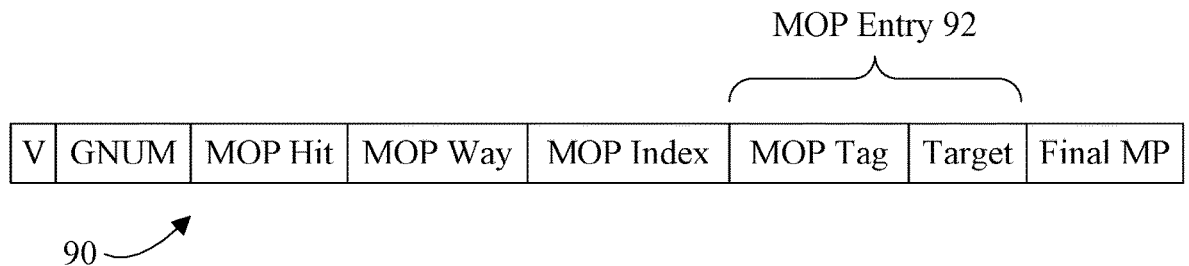
FIG. 4 is a block diagram of one embodiment of a training queue entry and MOP memory entry for the MOP shown in FIG. 3.

FIG. 4 is a block diagram of one embodiment of a training queue entry 90. In the illustrated embodiment, the training queue entry 90 includes a valid bit (V), a global number (GNUM), a MOP hit bit, a MOP Way, a MOP Index, a MOP Tag, a target, and a final misprediction bit (Final MP). The MOP Tag and the target may form a MOP entry 92 in the MOP memory 84 (along with a valid bit), in an embodiment.

The valid bit may indicate whether or not the entry is in use (e.g. valid if set, invalid if clear, or vice versa). The GNUM may be a tag assigned by the decode/map unit 22 to track the instruction, similar to other instructions. For example, the GNUM may identify a reorder buffer entry assigned to the instruction (or to a group of instructions that were concurrently fetched, in an embodiment). The MOP hit bit may indicate whether or not a MOP hit was detected for the indirect branch instruction. If the instruction was a MOP miss, a MOP memory entry may need to be allocated for it when the training entry is complete. Alternatively, the MOP memory entry may be allocated in response to detecting the miss and the MOP index and MOP way may identify the allocated entry. If the MOP entry was a hit, the MOP way and MOP index may identify the hitting entry. The MOP tag and target may be the tag and predicted target address to be written to the MOP memory 84. The target may be initialized to the predicted target address from the MOP memory 84 for a MOP hit, or the predicted target address from the IBP 38, for a MOP miss. When the indirect branch operation is executed and the indirect branch is resolved, the target may be updated to the actual target if the predicted target address was incorrect. The final MP bit may be set to indicate that the predicted address was mispredicted, or clear to indicate correctly predicted, when the indirect branch operation is executed. The final MP bit may be an indication of whether or not the MOP entry needs to be updated (e.g. if it was a MOP hit and was not mispredicted, no update may be needed).

In an embodiment, the training queue entry 90 and the MOP entry 92 may be augmented with a bucket count field, which may be a count of the number of times the objective C message send routine 50 iterates through the bucket scan loop to scan additional entries (e.g. 0 in the case that the first entry is a match and the branch to the bucket scan loop is not taken, or 1 or more in other cases). The bucket count may be used to improve the accuracy of the prediction and/or to predict the branch to the bucket scan loop.

Returning to FIG. 3, the MOP control circuit 86 may be coupled to the MOP memory 84 and may receive hit, index, way, and MOP memory entry information to update the training queue entry for the operation. The MOP control circuit 86 may further update the training queue entry when the indirect branch operation is executed. The target may be received from the execution units 28A-28B (whichever executed in the indirect branch operation), and if the indirect branch was mispredicted the training queue entry 90 may be updated and the final MP bit may be set. If the indirect branch was not mispredicted the final MP bit may be cleared. In an embodiment, the indirect branch operation may be routed to the reservation station 24A by the decode/map unit 22 so that it is ensured to be executed by the execution unit 28A. In such an embodiment, the target address may only be received from the execution unit 28A. If the indirect branch was mispredicted by the MOP 34, the redirect from the execution unit 28A-28B may flush the instructions fetched from the target address predicted by the MOP 34 or IBP 38.

The MOP control circuit 86 may be configured to receive a retire indirect indication from the decode/map unit 22 when an indirect branch instruction that is predicted by the MOP 34 is retired. The indication may include the GNUM of the indirect branch instruction, identifying the training queue entry 90 in the training queue 82 that corresponds to the indirect branch instruction via a content addressable memory (CAM) comparison of the GNUM fields and valid bits. If the final MP bit is set in the matching entry, the MOP control circuit 86 may update the MOP entry with the target from the training queue entry. If the MOP hit bit is clear (MOP miss), the MOP control circuit 86 may allocate an MOP memory entry (if not allocated at miss detection) and write the data from the training queue entry to the MOP memory entry.

Figures 5, 6:
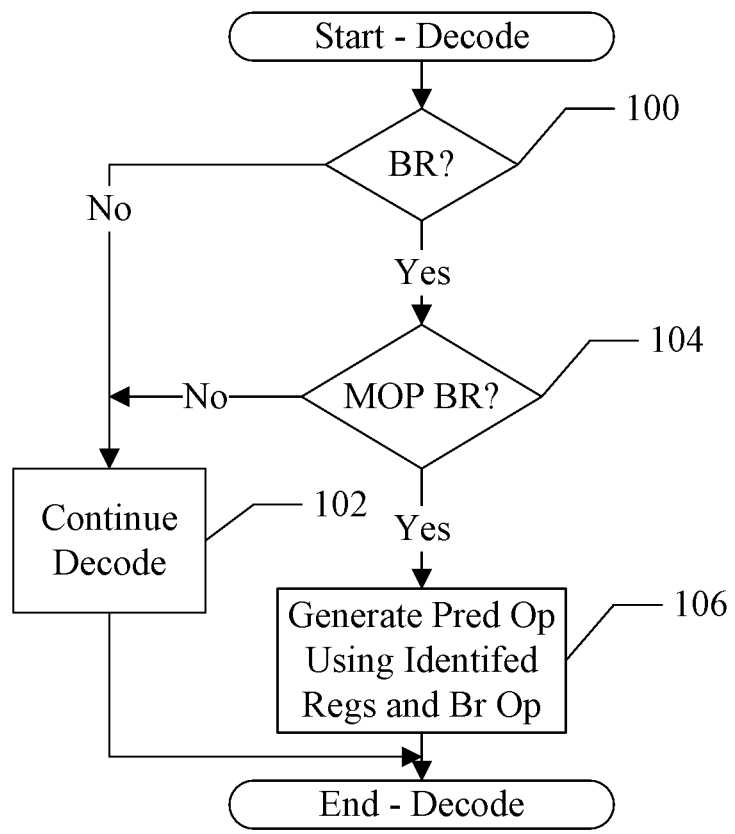
FIG. 5 is a block diagram illustrating one embodiment of an instruction operation sequence for an indirect branch instruction to be predicted by the MOP.
FIG. 6 is a flowchart illustrating one embodiment of a decode unit for the indirect branch instruction to be predicted by the MOP.

FIG. 5 is a block diagram of one embodiment of the instruction operations produced by the decode/map unit 22 for an indirect branch instruction that is to be predicted by the MOP 34. The instruction operations include a predict (pred) op 94 and an indirect branch op 96.

The pred op 94 includes the register operands to be used to predict the indirect branch as source operands (e.g. x16 and x1 in the embodiment of FIG. 5, although x0 and x1 or x12 and x1 may be used in other embodiments). The source operands may be renamed through the register renaming portion of the decode/map unit 22 and thus may access physical registers that contain the speculative contents of the registers that correspond to the current execution of the routine 50. While two registers are used to form the MOP prediction in this embodiment, other embodiments may use one register or more than two registers.

The pred op 94 may also include a temporary register (sts-temp) as a target, to create a dependency for the indirect branch op 96 on the pred op 94. The sts-temp register may be a condition code temporary register, which may clear the dependency more quickly than a general register dependency, in one embodiment. The sts-temp register may be used merely to ensure that the indirect branch op 96 is scheduled after the pred op 94, to simplify implementation. For example, if the indirect branch op 96 were permitted to be scheduled prior to the pred op 94 and the indirect branch op detected a misprediction, the redirect/flush for the indirect branch op might occur prior to a redirect/flush generated by the MOP 34 in response to the pred op 94. The redirect/flush from the MOP 34 would need to be prevented in that case (e.g. the redirect/flush would need to be suppressed). The dependency created by the sts-temp register avoids the above situation. In other embodiments, a general-purpose temporary register or any other temporary register may be used to create the dependency.

The pred op 94 may also carry the predicted target from the IBP 38 (IBP target in FIG. 5) for comparison to the MOP 34 predicted target.

The indirect branch op 96 may have the same coding as the original indirect branch op, except that is has the dependency on the sts-temp register. That is, the indirect branch op 96 is an indirect branch op to x17 in the illustrated embodiment. As with the pred op 94, the x17 register in the indirect branch op 96 may be renamed by the register renaming portion of the decode/map unit 22.

FIG. 6 is a flow chart illustrating operation of one embodiment of the decode/map unit 22 to decode the indirect branch instruction identified by the MOP configuration registers 20. While the blocks are shown in a particular order for ease of understanding, other orders may be used. Blocks may be performed in parallel in combinatorial logic in the decode/map unit 22. Blocks, combinations of blocks, and/or the flowchart as a whole may be pipelined over multiple clock cycles in the processor 12. The decode/map unit 22 may be configured to implement the operation illustrated in FIG. 6. The decode/map unit 22 may be configured to implement the operations in FIG. 6 in parallel for multiple instructions fetched concurrently from the ICache 18.

If the instruction being decoded is not an indirect branch instruction (e.g. a br branch, in the ARM instruction set architecture) (decision block 100, "no" leg), decoding of the instruction may continue for the instruction (block 102). The decoding may include generating one or more ops for the instruction, performing register renaming, etc.

If the instruction being decoded is an indirect branch instruction (decision block 100, "yes" leg), the decode/map unit 22 may compare data from the indirect branch instruction to data in the configuration registers 20 to determine if the indirect branch instruction is to be predicted by the MOP 34 (decision block 104). For example, the PC associated with the indirect branch instruction may be compared to a PC from the registers 20, operand(s) of the indirect branch instruction may be compared to operand(s) in the registers 20, other parts of indirect branch instruction may be compared to similar contents in the registers 20, combinations of the above, etc. If the indirect branch instruction is not to be predicted by the MOP 34 (decision block 104, "no" leg), the decode/map unit 22 may be configured to continue decode for the instruction (block 102). In this case, the decode may include generating the indirect branch op, without a dependency on the temp register and without the preceding pred op, for example. If the indirect branch instruction is to be predicted by the MOP 34 (decision block 104, "yes" leg), the decode/map unit 22 may be configured to generate the pred op 94 and the indirect branch op 96 using the architected registers identified by the configuration register 20 and the temporary register (block 106). The resulting decoded ops (from block 102 or block 106) may have their register operands renamed, the ops may be dispatched to the reservation stations 24A-24N, and the ops may be recorded in a reorder buffer, for example.

Figure 7:
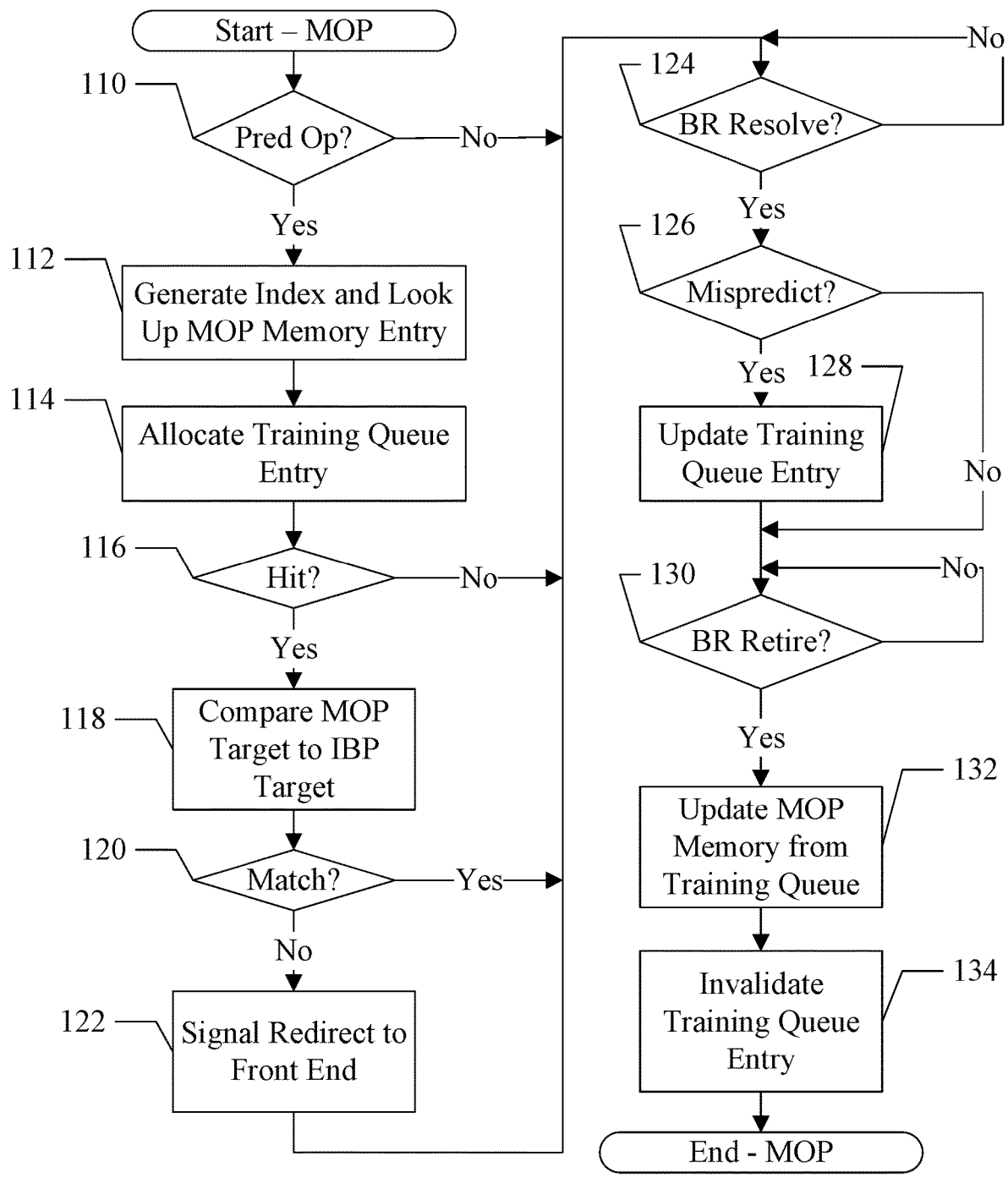
FIG. 7 is a flowchart illustrating operation of one embodiment of the MOP.

FIG. 7 is a flow chart illustrating operation of one embodiment of the MOP 34. While the blocks are shown in a particular order for ease of understanding, other orders may be used. Blocks may be performed in parallel in combinatorial logic in the MOP 34. Blocks, combinations of blocks, and/or the flowchart as a whole may be pipelined over multiple clock cycles in the processor 12. The MOP 34 may be configured to implement the operation illustrated in FIG. 7. The MOP 34 may be configured to implement the operations in FIG. 7 in parallel for multiple indirect branch instructions corresponding to different entries in the training queue 82.

If the MOP 34 receives a Pred op (decision block 110, "yes" leg), the index generation circuit 80 may generate the index from the register operands of the pred op (block 112). The MOP memory 84 may look up the MOP memory entry or entries responsive to the index. The MOP control circuit 86 may allocate a training queue entry to the op and may initialize the fields in the training queue entry (block 114). If the pred op is a hit in the MOP memory 84 (decision block 116, "yes" leg), the comparator 88 may compare the predicted target address from the MOP memory 84 to the predicted target address from the IBP 38 (block 118). If the addresses mismatch (decision block 120, "no" leg), the MOP 34 may signal a redirect to the front end of the processor 12 (e.g. the IBP 38 and/or the fetch address generation circuit 14) with the predicted target address from the MOP memory 84 as the redirect address (block 122). The fetch address generation circuit 14 may begin fetching at the redirect address. The decode/map unit 22 may also receive an indication of the redirect and may flush instructions fetched from the previously predicted target address.

The MOP 34 may wait for the indirect branch op corresponding to the pred op to executed (decision block 124, "no" leg). If the indirect branch op executes and resolves the actual target address (decision block 124, "yes" leg) and is mispredicted (decision block 126, "yes" leg) the MOP control circuit 86 update the training queue entry with the correct target address supplied by the execution unit 28A-28B (block 128). The execution unit 28A-28B may also report the redirect for the misprediction to the front end of the processor 12 to redirect/flush.

The MOP 34 may wait for the indirect branch instruction to retire (decision block 130, "no" leg). If the indirect branch instruction retires (decision block 130, "yes" leg), the MOP control circuit 86 may update the MOP memory 84 from the training queue entry, if there has been a misprediction (block 132). If not, the MOP memory 84 need not be updated. The MOP control circuit 86 may invalidate the training queue entry, freeing the entry to be used for another execution of the indirect branch instruction (block 134).

Figure 8:
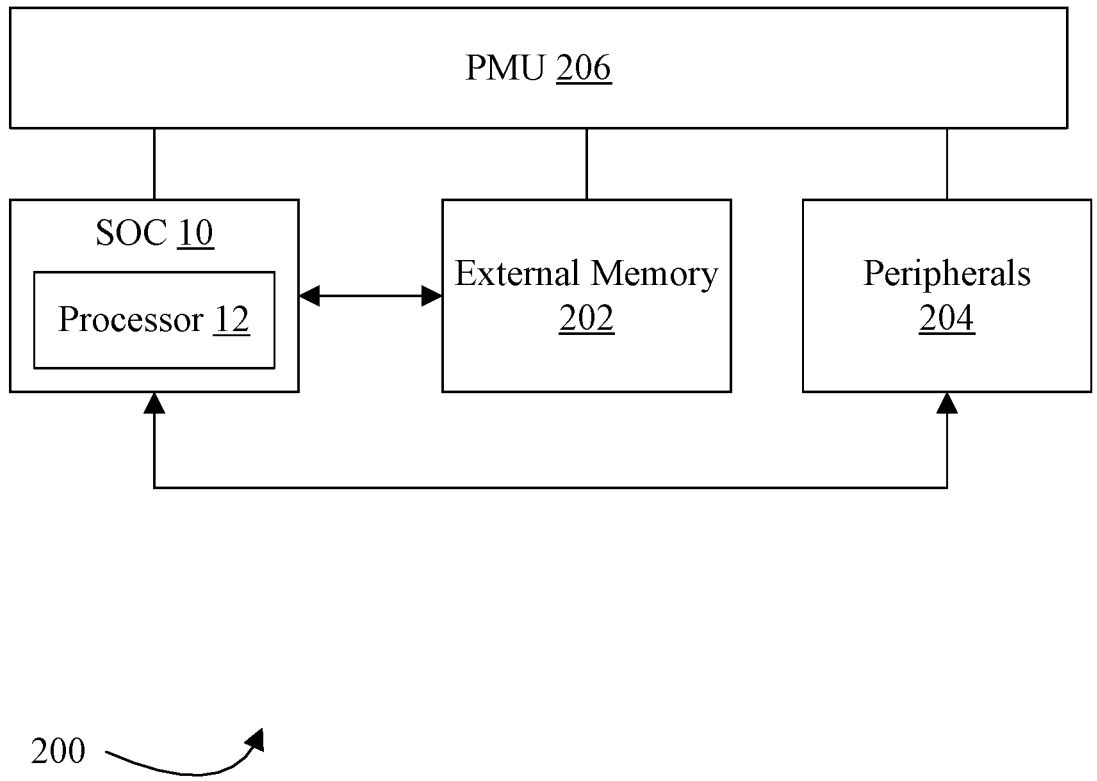
FIG. 8 is a block diagram of one embodiment of a system including the processor shown in FIG. 1.

FIG. 8 is a block diagram of one embodiment of a system 200. In the illustrated embodiment, the system 200 includes at least one instance of an integrated circuit (IC) 10, which may be a system on a chip (SOC) 10 in this embodiment, coupled to one or more peripherals 204 and an external memory 202. A power supply 206 is provided which supplies the supply voltages to the SOC 10 as well as one or more supply voltages to the memory 202 and/or the peripherals 204. The SOC 10 may include one or more instances of the processor 12. In other embodiments, multiple SOCs 10 may be provided with instances of the processor 12 included in them.

The peripherals 204 may include any desired circuitry, depending on the type of system 200. For example, in one embodiment, the system 200 may be a computing device (e.g., personal computer, laptop computer, etc.), a mobile device (e.g., personal digital assistant (PDA), smart phone, tablet, etc.), or an application specific computing device. In various embodiments of the system 200, the peripherals 204 may include devices for various types of wireless communication, such as wifi, Bluetooth, cellular, global positioning system, etc. The peripherals 204 may also include additional storage, including RAM storage, solid state storage, or disk storage. The peripherals 204 may include user interface devices such as a display screen, including touch display screens or multitouch display screens, keyboard or other input devices, microphones, speakers, etc. In other embodiments, the system 200 may be any type of computing system (e.g. desktop personal computer, laptop, workstation, net top etc.).

The external memory 202 may include any type of memory. For example, the external memory 202 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 202 may include one or more memory modules to which the memory devices are mounted, such as single inline memory modules (SIMMs), dual inline memory modules (DIMMs), etc. Alternatively, the external memory 202 may include one or more memory devices that are mounted on the SOC 10 in a chip-on-chip or package-on-package implementation.

Figure 9:
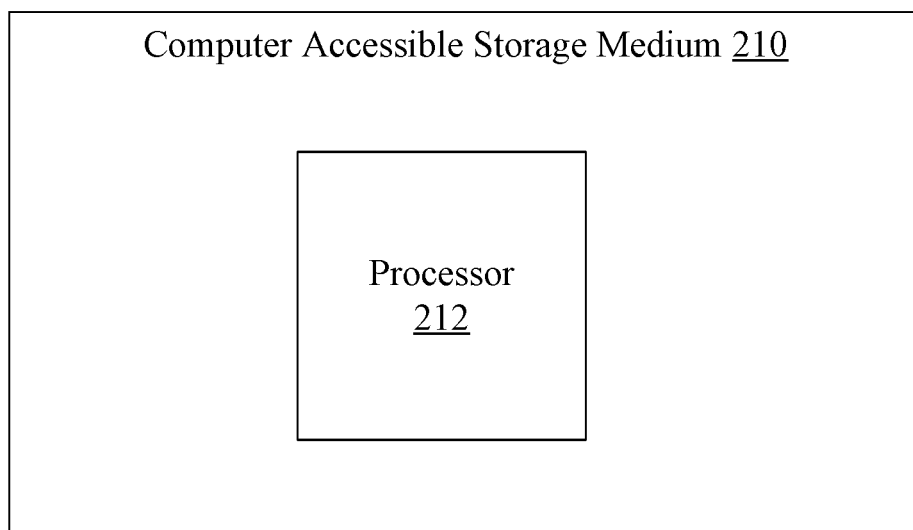
FIG. 9 is a block diagram of one embodiment of a computer accessible storage medium.

Turning now to FIG. 9, a block diagram of one embodiment of a computer readable storage medium 210 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 210 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 210 in FIG. 8 may store a database 212 representative of the processor 12. Generally, the database 212 may be a database which can be read by a program and used, directly or indirectly, to fabricate the hardware comprising the processor 12. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the processor 12. The netlist may then be placed and routed to produce a data set describing geometric shapes to be applied to masks. The masks may then be used in various semiconductor fabrication steps to produce a semiconductor circuit or circuits corresponding to the processor 12. Alternatively, the database 212 on the computer accessible storage medium 210 may be the netlist (with or without the synthesis library) or the data set, as desired.

While the computer accessible storage medium 210 stores a representation of the processor 12, other embodiments may carry a representation of any portion of the processor 12, as desired, including any subset of the components shown in FIG. 1. The database 212 may represent the SOC 10 or any portion thereof. The database 212 may represent any portion of the above.

In accordance with the above description, various embodiments of a processor have been described. The processor may comprise a first indirect branch predictor and a second indirect branch predictor. The first indirect branch predictor may be configured to predict a first predicted target address of an indirect branch instruction responsive to an instruction fetch address. The second indirect branch predictor may be configured to predict a second predicted target address of the indirect branch instruction responsive to one or more register values. The one or more register values may be operands of instructions prior to the indirect branch instruction in program order, and the second indirect branch predictor may be configured flush instruction operations corresponding to instructions fetched from the first predicted target address and redirect instruction fetching of the processor to the second predicted target address responsive to the second to predicted target address differing from the first predicted target address. In an embodiment, the processor further comprises an execution unit configured to execute an indirect branch instruction operation corresponding to the indirect branch instruction. The execution unit may be configured to generate an actual target address of the indirect branch instruction and to flush instruction operations fetched subsequent to the indirect branch instruction responsive to the actual target address differing from the second predicted target address. In one embodiment, the second indirect branch predictor includes a memory and an index generation circuit coupled the memory, wherein the second index generation circuit may be configured to generate an index to address the memory responsive to the one or more register values, wherein the memory may be configured to output one or more addresses from a memory location addressed by the index. The memory may be configured to output one or more tags corresponding to the one or more addresses, wherein the second indirect branch predictor is configured to select the second predicted target address from the one or more addresses responsive to the one or more tags. The second indirect branch predictor may be configured not to flush the instructions fetched from the first predicted target address and not to redirect instruction fetching responsive to the second predicted target address matching the first predicted target address. In an embodiment, the processor further comprises a decode unit configured to decode the indirect branch instruction into a first instruction operation that, when executed, accesses the second indirect branch predictor and a second instruction operation that, when executed, performs the indirect branch operation. The first instruction operation may have the one or more registers that store the one or more register values as source operands. The second instruction operation may have a dependency on the first instruction operation. The decode unit may include one or more configuration registers that are programmed with data identifying the indirect branch instruction, wherein other indirect branch instructions may not be predicted by the second indirect branch predictor.

In an embodiment an indirect branch predictor comprises an index generation circuit, a memory coupled to the index generation circuit, and a control circuit coupled to the memory. The index generation circuit may be configured to generate an index from one or more register values associated with an indirect branch instruction. The memory may be configured to output at least one predicted target address responsive to the index. The control circuit may be configured to select a predicted target address for an indirect branch instruction from the at least one predicted target address. The indirect branch predictor may further comprise a comparator coupled to the predicted target address and coupled to a second predicted target address previously generated for the indirect branch instruction. Responsive to a miscompare between the predicted target address and the second predicted target address, the comparator is configured to signal a redirect for the indirect branch instruction. Responsive to the predicted target address and the second predicted target address comparing equal, the comparator signals no redirect and fetching continues with instructions at the predicted target address. In an embodiment, the indirect branch predictor may comprise a training queue coupled to the control circuit, wherein the control circuit may be configured to allocate a first entry in the training queue responsive to receiving the one or more register values. The control circuit may be configured to initialize data in the first entry to identify a memory location in the memory from which the predicted target address may be selected. The control circuit may be configured to update the first entry responsive to execution of an indirect branch operation corresponding to the indirect branch instruction. The update may include the actual branch target address and an indication of whether or not the indirect branch instruction was mispredicted at execution of the indirect branch operation. The control circuit may be configured to update the memory from the first entry responsive to retirement of the indirect branch instruction.

In an embodiment, a method comprises: predicting a first target address of an indirect branch instruction responsive to one or more register values, wherein at least one of the one or more register values is a source register for a load operation on which the indirect branch is dependent; determining whether or not the first target address is mispredicted; and responsive to the first target address being mispredicted, training an indirect branch predictor that generated the first target address with the actual target address. The method may further comprises comparing the first target address to a previous target address predicted by a different indirect branch predict; and redirecting fetch from the previous target address to the first target address responsive to the comparing indicating not equal. The method may further comprise redirecting fetch in a processor including the indirect branch predictor responsive to the first target address being mispredicted. The indirect branch instruction may be indirectly dependent on the load operation.

Numerous variations and modifications will become apparent to those skilled in the art once the above disclosure is fully appreciated. It is intended that the following claims be interpreted to embrace all such variations and modifications.

What is claimed is:

1. A processor comprising:
a first indirect branch predictor configured to predict a first predicted target address of an indirect branch instruction responsive to an instruction fetch address; and
a second indirect branch predictor configured to predict a second predicted target address of the indirect branch instruction responsive to one or more register values, wherein the one or more register values are source operands of load instructions prior to the indirect branch instruction in program order, and wherein the processor is configured to form a memory address based on the source operands of a memory location read by a given load instruction to obtain data from which a target address of the indirect branch instruction is derived, and wherein the indirect branch instruction is dependent on the load instructions, and wherein the second indirect branch predictor is configured to redirect instruction fetching of the processor to the second predicted target address responsive to the second predicted target address differing from the first predicted target address.

2. The processor as recited in claim 1 further comprising an execution unit configured to execute an indirect branch instruction operation corresponding to the indirect branch instruction, wherein the execution unit is configured to generate an actual target address of the indirect branch instruction and to redirect instruction fetching of the processor responsive to the actual target address differing from the second predicted target address.

3. The processor as recited in claim 1 wherein the second indirect branch predictor includes a memory and an index generation circuit coupled the memory, wherein the index generation circuit is configured to generate an index to address the memory responsive to the one or more register values, wherein the memory is configured to output one or more addresses from a memory location addressed by the index.

4. The processor as recited in claim 3 wherein the memory is configured to output one or more tags corresponding to the one or more addresses, wherein the second indirect branch predictor is configured to select the second predicted target address from the one or more addresses responsive to the one or more tags.

5. The processor as recited in claim 1 wherein the second indirect branch predictor is configured not to redirect fetching from the first predicted target address responsive to the second predicted target address matching the first predicted target address.

6. A processor comprising:
a first indirect branch predictor configured to predict a first predicted target address of an indirect branch instruction responsive to an instruction fetch address;
a second indirect branch predictor configured to predict a second predicted target address of the indirect branch instruction responsive to one or more register values, wherein the one or more register values are operands of instructions prior to the indirect branch instruction in program order, and wherein the second indirect branch predictor is configured to redirect instruction fetching of the processor to the second predicted target address responsive to the second predicted target address differing from the first predicted target address; and
a decode unit configured to decode the indirect branch instruction into a first instruction operation that, when executed, accesses the second indirect branch predictor and a second instruction operation that, when executed, performs an indirect branch operation.

7. The processor as recited in claim 6 wherein the first instruction operation has one or more registers that store the one or more register values as source operands.

8. The processor as recited in claim 6 wherein the second instruction operation has a dependency on the first instruction operation.

9. The processor as recited in claim 6 wherein the decode unit includes one or more configuration registers that are programmed with data identifying the indirect branch instruction, wherein other indirect branch instructions are not predicted by the second indirect branch predictor.

10. An indirect branch predictor comprising:
an index generation circuit configured to generate an index from one or more register values associated with an indirect branch instruction, wherein the one or more register values are source operands of load instructions prior to the indirect branch instruction in program order on which the indirect branch instruction is dependent, and wherein a memory address of a given load instruction is formed based on the source operands, and wherein a memory location at the memory address is read by the given load instruction to obtain data from which a target address of the indirect branch instruction is derived; and a memory coupled to the index generation circuit and configured to output a predicted target address responsive to the index.

11. The indirect branch predictor as recited in claim 10 further comprising a comparator coupled to the predicted target address and coupled to a second predicted target address previously generated for the indirect branch instruction.

12. The indirect branch predictor as recited in claim 11 wherein, responsive to a miscompare between the predicted target address and the second predicted target address, the comparator is configured to signal a redirect for the indirect branch instruction.

13. The indirect branch predictor as recited in claim 12 wherein, responsive to the predicted target address and the second predicted target address comparing equal, the comparator signals no redirect and fetching continues with instructions at the predicted target address.

14. The indirect branch predictor as recited in claim 10 further comprising a training queue coupled to a control circuit that is also coupled to the memory, wherein the control circuit is configured to allocate a first entry in the training queue responsive to the index generation circuit receiving the one or more register values, and wherein the control circuit is configured to initialize data in the first entry to identify a memory location in the memory from which the predicted target address is selected.

15. The indirect branch predictor as recited in claim 14 wherein the control circuit is configured to update the first entry responsive to execution of an indirect branch operation corresponding to the indirect branch instruction, the update including an actual branch target address and an indication of whether or not the indirect branch instruction was mispredicted at execution of the indirect branch operation.

16. The indirect branch predictor as recited in claim 14 wherein the control circuit is configured to update the memory from the first entry responsive to retirement of the indirect branch instruction.

17. A method comprising:
predicting a first target address of an indirect branch instruction responsive to one or more register values, wherein at least one of the one or more register values is a source operand for a load operation on which the indirect branch instruction is dependent, and wherein a memory address of the load operation is formed based on the source operand, and wherein a memory location at the memory address is read by the load operation to obtain data from which a target address of the indirect branch instruction is derived;
determining whether or not the first target address is mispredicted; and
responsive to the first target address being mispredicted, training an indirect branch predictor that generated the first target address with an actual target address generated during execution of the indirect branch instruction.

18. The method as recited in claim 17 further comprising:
comparing the first target address to a previous target address predicted by a different indirect branch predictor; and
redirecting fetch from the previous target address to the first target address responsive to the comparing indicating not equal.

19. The method as recited in claim 17 further comprising redirecting fetch in a processor including the indirect branch predictor responsive to the first target address being mispredicted.

20. The method as recited in claim 17 wherein the indirect branch instruction is indirectly dependent on the load operation.

* * * * *